United States Patent
Kim et al.

(10) Patent No.: US 10,824,286 B2
(45) Date of Patent: Nov. 3, 2020

(54) FILM TOUCH SENSOR AND TOUCH SCREEN PANEL INCLUDING THE SAME

(71) Applicant: DONGWOO FINE-CHEM CO., LTD., Jeollabuk-do (KR)

(72) Inventors: Sang Kook Kim, Gyeonggi-do (KR); Seung June Park, Gyeonggi-do (KR); Seong Hwan Park, Gyeonggi-do (KR); Sung Hoon Cho, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 153 days.

(21) Appl. No.: 16/146,101

(22) Filed: Sep. 28, 2018

(65) Prior Publication Data

US 2019/0034006 A1 Jan. 31, 2019

Related U.S. Application Data

(63) Continuation of application No. PCT/KR2017/002740, filed on Mar. 14, 2017.

(30) Foreign Application Priority Data

Mar. 31, 2016 (KR) .................. 10-2016-0038982

(51) Int. Cl.
| | |
|---|---|
| *G06F 3/044* | (2006.01) |
| *B32B 7/10* | (2006.01) |
| *B32B 27/26* | (2006.01) |
| *B32B 27/28* | (2006.01) |
| *B32B 27/36* | (2006.01) |

(52) U.S. Cl.
CPC .............. *G06F 3/044* (2013.01); *B32B 7/10* (2013.01); *B32B 27/26* (2013.01); *B32B 27/28* (2013.01); *B32B 27/36* (2013.01); *G06F 2203/04102* (2013.01)

(58) Field of Classification Search
CPC ........................................ H01L 29/43–29/518
See application file for complete search history.

(56) References Cited

FOREIGN PATENT DOCUMENTS

| | | |
|---|---|---|
| CN | 101391496 A | 3/2009 |
| CN | 104205247 A | 12/2014 |
| JP | 2012009219 A | 1/2012 |
| JP | 2012-163735 A | 8/2012 |
| JP | 2012-183737 A | 9/2012 |
| JP | 2013-238717 A | 11/2013 |
| KR | 10-2004-0041657 A | 5/2004 |
| KR | 10-0647701 B1 | 11/2006 |
| KR | 10-2011-0031300 A | 3/2011 |
| KR | 10-2011-0129930 A | 12/2011 |
| KR | 10-1586740 B1 | 1/2016 |
| TW | 201542385 A | 11/2015 |
| WO | WO 03/032332 A1 | 4/2003 |

OTHER PUBLICATIONS

Notice of Allowance dated Jan. 22, 2019 from Korean Patent Office in a counterpart Korean Patent Application No. 10-2016-0038982 (all the cited references are listed in this IDS.) (English translation is submitted herewith).
International Search Report for PCT/KR2017/002740 dated Jul. 19, 2017.

*Primary Examiner* — Ramsey Zacharia
(74) *Attorney, Agent, or Firm* — The PL Law Group, PLLC

(57) ABSTRACT

A film touch sensor includes a separation layer, a first protection layer on the separation layer, and an electrode pattern layer on the first protection layer. An alkoxy group having 1 to 5 carbon atoms from the separation layer, and at least one substituent group of a hydroxyl group, a carboxyl group or an amide group from the first protection layer are reacted with each other to form a chemical bond between the separation layer and the first protection layer. Thus, electrode damages and cracks are prevented during a detaching process from a carrier substrate to improve flexibility and durability of the film touch sensor.

10 Claims, No Drawings

FILM TOUCH SENSOR AND TOUCH SCREEN PANEL INCLUDING THE SAME

PRIORITY

The present application is a continuation application to International Application No. PCT/KR2017/002740 with an International Filing Date of Mar. 14, 2017, which claims the benefit of Korean Patent Application No. 10-2016-0038982 filed on Mar. 31, 2016 at the Korean Intellectual Property Office, the disclosures of which are incorporated by reference herein in their entirety.

BACKGROUND

1. Field

The present invention relates to a film touch sensor and a touch screen panel including the same.

2. Description of the Related Art

A touch screen panel is an input device capable of transferring an instruction of a user by selecting a position or a character displayed on a screen of an image display device with a finger of the user or an object. The touch screen panel may be disposed on a front face of the image display device, and may be configured to convert a contact area touched by the finger or the object into an electrical signal. Accordingly, the instruction selected at the contact area may be received as an input signal.

The touch screen panel may replace an individual input device such as a keyboard or a mouse which is connected to the image display device, so that an application of the touch screen panel is expanded.

The touch screen panel is categorized as a resistive-type, a capacitive-type, a light sensitive-type, etc. In the capacitive-type touch screen panel, a capacity change may be generated between a conductive sensing pattern, and another neighboring sensing pattern or ground electrode when the finger or the object contacts the screen. The capacity change may be detected so that the contact area may be converted to the electrical signal.

The touch screen panel is commonly disposed on an outer face of a flat display device such as a liquid crystal display device or an organic light emitting diode display device to be fabricated into a product. Thus, an improved transparency and a thin thickness may be required in the touch screen panel.

Recently, a flexible flat display device has been developed, and a flexible property is also required in the touch screen panel formed thereon.

While fabricating the flexible touch screen panel, a bending stress may be consistently generated during, e.g., a detach process from a carrier substrate. Thus, a protection from electrode damages or cracks may be needed.

However, a substrate having sufficient anti-fatigue failure property for the touch screen panel has not been developed.

For example, Korean Patent No. 647701 discloses a flat display device including a flexible substrate and a flexible thin film transistor.

SUMMARY

According to aspects of the present invention, there is provided a film touch sensor in which electrode damages and cracks may be prevented by a chemical bond between a separation layer and a protection layer while detaching from a carrier substrate.

In some aspects of the present invention, a film touch sensor having improved flexibility and mechanical durability from enhanced interlayer adhesion is provided.

In some aspects of the present invention, a film touch sensor having improved transmittance is provided.

According to aspects of the present invention, there is provided a touch screen panel including the film touch sensor.

According to aspects of the present invention, there is provided an image display device including the touch screen panel.

The above-described aspects of the present invention will be achieved by the following characteristics:

(1) A film touch sensor including:

a separation layer; a first protection layer on the separation layer; and an electrode pattern layer on the first protection layer, wherein an alkoxy group having 1 to 5 carbon atoms from the separation layer, and at least one substituent group of a hydroxyl group, a carboxyl group or an amide group from the first protection layer are reacted with each other to form a chemical bond between the separation layer and the first protection layer.

(2) The film touch sensor according to the above (1), wherein the separation layer is formed of a composition including a binder resin and a melamine-based curing agent containing the alkoxy group having 1 to 5 carbon atoms.

(3) The film touch sensor according to the above (2), wherein the melamine-based curing agent includes at least one selected from compounds represented by Chemical Formulae 1 to 6 below:

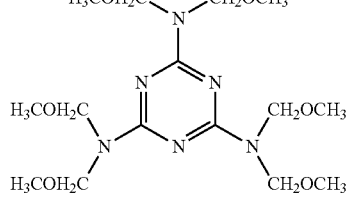

[Chemical Formula 1]

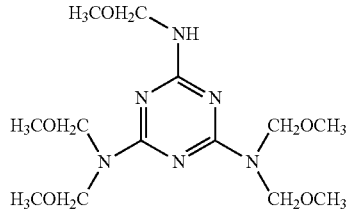

[Chemical Formula 2]

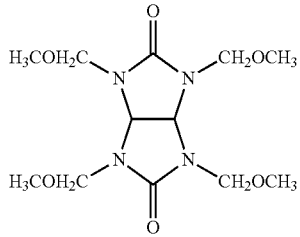

[Chemical Formula 3]

-continued

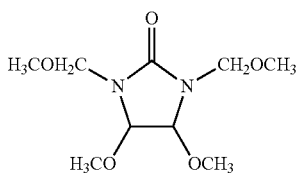
[Chemical Formula 4]

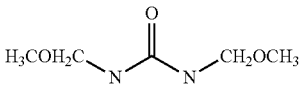
[Chemical Formula 5]

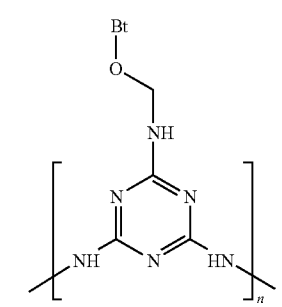
[Chemical Formula 6]

wherein, in the Chemical Formulae above, n is an integer from 5 to 20.

(4) The film touch sensor according to the above (2), wherein the binder resin of the separation layer includes at least one polymer including a repeating unit represented by Chemical Formula 7 or Chemical Formula 8:

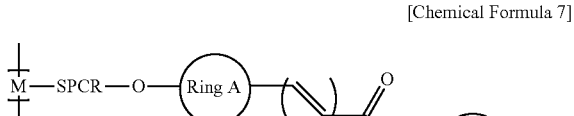
[Chemical Formula 7]

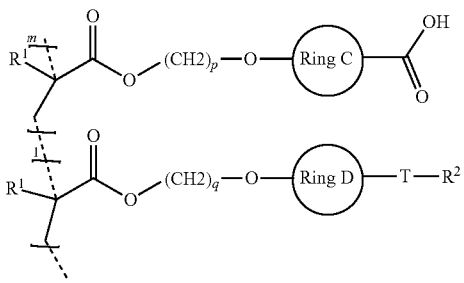
[Chemical Formula 8]

wherein, in Chemical Formulae 7 and 8, M is a monomer unit forming a backbone of a homopolymer or a copolymer,
SPCR is a spacer unit,
Ring A is a substituted or non-substituted alicyclic hydrocarbon, or a substituted or non-substituted aromatic ring,
Ring B is a substituted or non-substituted aromatic ring,
Z is an alkyl group, an alkoxy group, a cyano group, a nitro group, a halogen atom, —CH=CHZ$_1$, —C≡CZ$_1$ (Z$_1$ is an alkyl group, an alkoxy group, an alkoxy carbonyl group, an alkoxy sulfonyl group, a cyano group, a nitro group or a halogen atom), —COOZ$_2$ or —SO$_3$Z$_2$ (Z$_2$ is an alkyl group),
n is 0 or 1, R$^1$ is a hydrogen atom or a methyl group,
R$^2$ is a phenyl group substituted with a group selected from an alkyl group, an alkoxy group, a cyano group or a halogen atom,
Ring C and Ring D is each independently

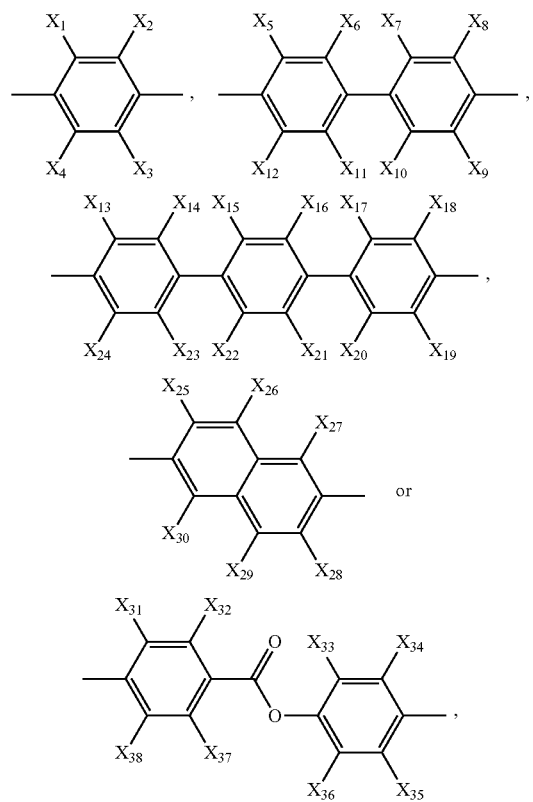

X$_1$ to X$_{38}$ each independently represents a hydrogen atom, an alkyl group, an alkoxy group, a halogen atom or a cyano group,
T is —CH=CHCOO— (a trans form) or —N≡N—,
p and q are each independently 1 to 12,
m and l each represents a mole ratio of each monomer which satisfies a relation of 0.650.95, 0.050.35 and m+l=1,
the alkyl groups are each independently C1 to C12 alkyl group, and the alkoxy groups are each independently C1 to C12 alkoxy group.

(5) The film touch sensor according to the above (2), wherein the melamine-based curing agent is included in an amount of from 120% to 250% relative to an equivalent amount of the polymer represented by Chemical Formula 7 or Chemical Formula 8.

(6) The film touch sensor according to the above (1), wherein the first protection layer is formed of a composition for a protection layer which includes a polymer containing at least one of a hydroxyl group, a carboxyl group or an amide group.

(7) The film touch sensor according to the above (6), wherein the polymer of the first protection layer includes at least one from repeating units represented by Chemical Formula 9 or 10:

[Chemical Formula 9]

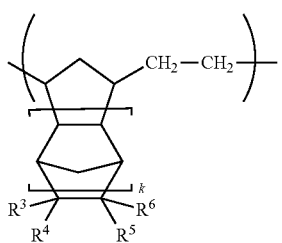

[Chemical Formula 10]

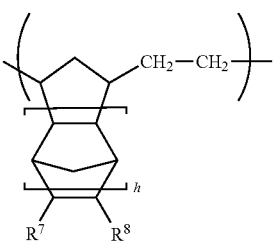

wherein in Chemical Formulae 9 and 10, at least one of $R^3$ to $R^6$ is $-H_n-Y_1$, n is 0 or 1, H is a C1 to C6 alkylene group or a carbonyl group, $Y_1$ is a protic polar group, a remaining one of $R^3$ to $R^6$ except for the at least one is hydrogen or $-H_n-Y_2$, $Y_2$ is a C1 to C6 alkyl group, a C6 to C12 aryl group or a protic polar group, $Y_2$ is capable of being substituted with a C1 to C4 alkyl group or a C6 to C12 aryl group, $R^7$ and $R^8$ are connected to each other to form a three-membered or five-membered hetero ring capable of being substituted with a C1 to C4 alkyl group or a C6 to C12 aryl group, k is an integer from 0 to 2, h is an integer from 0 to 2, and the protic polar groups are each independently a hydroxyl group, a carboxyl group or an amide group.

(8) The film touch sensor according to the above (6), the polymer of the first protection layer has a weight average molecular weight ranging from 1,000 to 1,000,000.

(9) A touch screen panel including the film touch sensor according to any one of the above (1) to (8).

(10) An image display device including the touch screen panel according to claim 9.

DETAILED DESCRIPTIONS

Example embodiments of the present invention relate to a film touch sensor and a touch screen panel including the same. More particularly, the film touch sensor comprises a separation layer; a first protection layer disposed on the separation layer; and an electrode pattern layer disposed on the first protection layer. An alkoxy group having 1 to 5 carbon atoms from the separation layer, and at least one substituent group of a hydroxyl group, a carboxyl group or an amide group from the first protection layer may be reacted with each other to form a chemical bond between the separation layer and the first protection layer so that electrode damages and cracks may be prevented during a detaching process from a carrier substrate, and an interlayer adhesion may be improved to realize excellent flexibility and mechanical durability.

<Film Touch Sensor>

A film touch sensor according to example embodiments of the present invention includes a separation layer, a first protection layer on the separation layer, and an electrode pattern layer on the first protection layer.

A manufacturing process of the film touch sensor may be performed on a carrier substrate, and a stack structure may be detached from the carrier substrate to form the film touch sensor. The separation layer may be formed for a separation from the carrier substrate.

Separation Layer

The separation layer may not be removed after being detached from the carrier substrate, and may coat and protect the electrode pattern layer.

The separation layer according to example embodiments of the present invention may be formed from a composition for forming the separation layer that may include a binder resin and a melamine-based curing agent containing a C1 to C5 (1 to 5 carbon atoms) alkoxy group.

The melamine-based curing agent may be used for forming the separation layer so that a formation of a chemical bond with the first protection layer may be facilitated as described below. Accordingly, electrode damages and cracks may be prevented during a detaching process.

The melamine-based curing agent according to example embodiments of the present invention may include any compound including the C1 to C5 alkoxy group without a specific limitation. For example, the melamine-based curing agent may include at least one of compounds represented by Chemical Formulae 1 to 6 below.

[Chemical Formula 1]

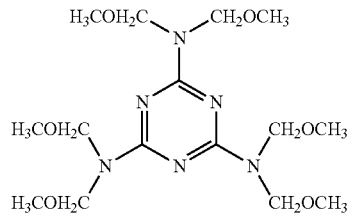

[Chemical Formula 2]

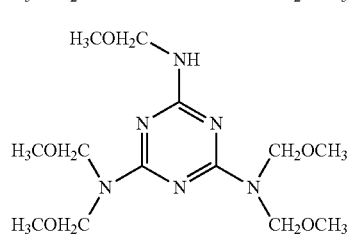

[Chemical Formula 3]

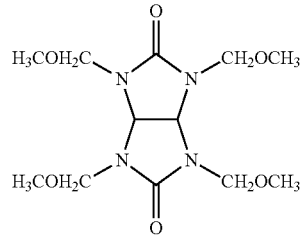

[Chemical Formula 4]

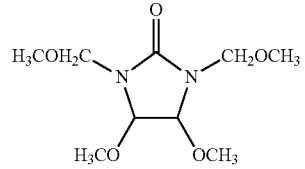

-continued

[Chemical Formula 5]

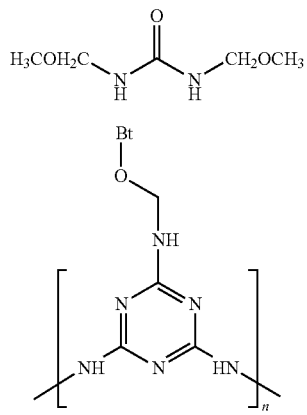

[Chemical Formula 6]

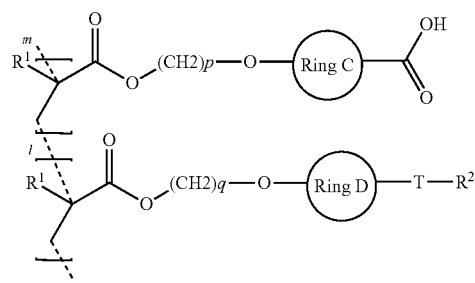

(In Chemical Formula 6, n is an integer of 5 to 20).

The composition for forming the separation layer may further include at least one polymer including a repeating unit represented by Chemical Formula 7 or Chemical Formula 8.

[Chemical Formula 7]

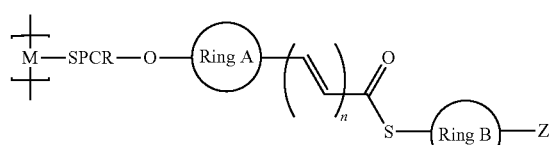

[Chemical Formula 8]

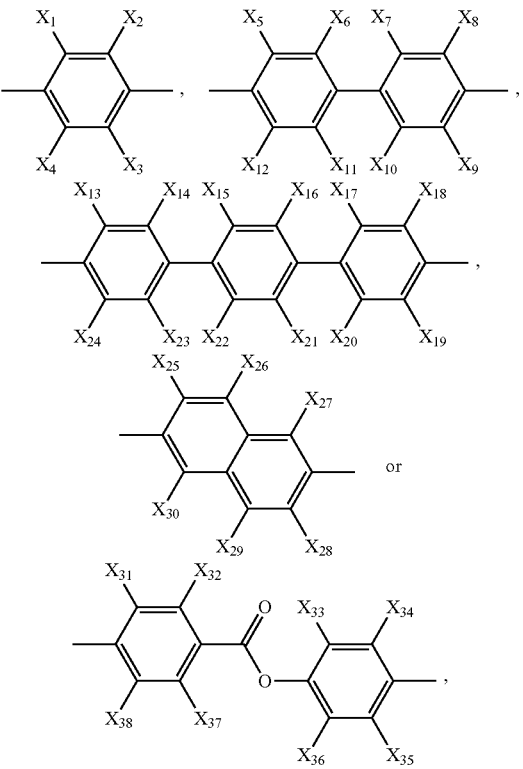

(In the Chemical Formulae above, M represents a monomer unit forming a backbone of a homopolymer or a copolymer, SPCR represents a spacer unit, Ring A represents a substituted or non-substituted alicyclic hydrocarbon, or a substituted or non-substituted aromatic ring, Ring B represents a substituted or non-substituted aromatic ring, Z represents an alkyl group, an alkoxy group, a cyano group, a nitro group, a halogen atom, —CH=CHZ$_1$, —C≡CZ$_1$ (Z$_1$ is an alkyl group, an alkoxy group, an alkoxy carbonyl group, an alkoxy sulfonyl group, a cyano group, a nitro group or a halogen atom), —COOZ$_2$ or —SO$_3$Z$_2$ (Z$_2$ is an alkyl group), n is 0 or 1, R$^1$ represents a hydrogen atom or a methyl group, R$^2$ represents a phenyl group substituted with a group selected from an alkyl group, an alkoxy group, a cyano group or a halogen atom, Ring C and Ring D each independently represents $X_1$ to $X_{38}$ each independently represents a hydrogen atom, an alkyl group, an alkoxy group, a halogen atom or a cyano group, T is —CH=CHCOO— (a trans form) or —N=N—, p and q are each independently 1 to 12, m and l each represents a mole ratio of each monomer which satisfies a relation of 0.65￨0.95, 0.05￨0.35 and m+l=1, the alkyl groups are each independently C1 to C12 alkyl group, and the alkoxy groups are each independently C1 to C12 alkoxy groups).

In the Chemical Formula 7 above, M is the monomer unit forming a backbone of a homopolymer or copolymer, which may include a monomer unit widely used in a field related in the art. For example, the monomer unit may include at least one of acrylate, methacrylate, 2-chloroacrylate, 2-phenylacrylate, acrylamide, methacrylamide, 2-chloroacrylamide, 2-phenylacrylamide, vinylether, a styrene derivative (e.g., α-methylstyrene, p-styrene sulfonate), a maleic acid derivative (e.g., maleic acid ester, phenylmaleimide, cyclohexyl maleimide), a fumaric acid derivative (e.g., fumaric acid ester), siloxane or epoxide. If M consists of a single monomer unit, a polymer formed from the monomer of Chemical Formula 7 is the homopolymer. If M includes at least two different monomer units, the polymer formed from the monomer of Chemical Formula 7 is the copolymer. The copolymer may include any of an alternating-type, a random type or a graft-type. The monomer unit may include, for example, acrylate or methacrylate.

SPCR is the spacer unit that may be widely used in this field. The spacer unit may include, e.g., —(CH$_2$)w-(w is an integer of 1 to 12), 1,2-propylene, 1,3-butylene, cyclopentane-1,2-diyl, cyclopentane-1,3-diyl, cyclohexane-1,3-diyl, cyclohexane-1,4-diyl, piperidine-1,4-diyl, piperazine-1,4-diyl, 1,2-phenylene, 1,3-phenylene, 1,4-phenylene or the like. For example, the spacer unit may be —(CH$_2$)w- (w is an integer of 1 to 12). For example, w may be an integer of 3 to 9, preferably 5 to 7, and more preferably, w is 6.

Ring A represents the substituted or non-substituted alicyclic hydrocarbon, or the substituted or non-substituted aromatic ring. For example, Ring A may be the substituted or non-substituted aromatic ring, more preferably the non-substituted aromatic ring.

For example, Ring A may be

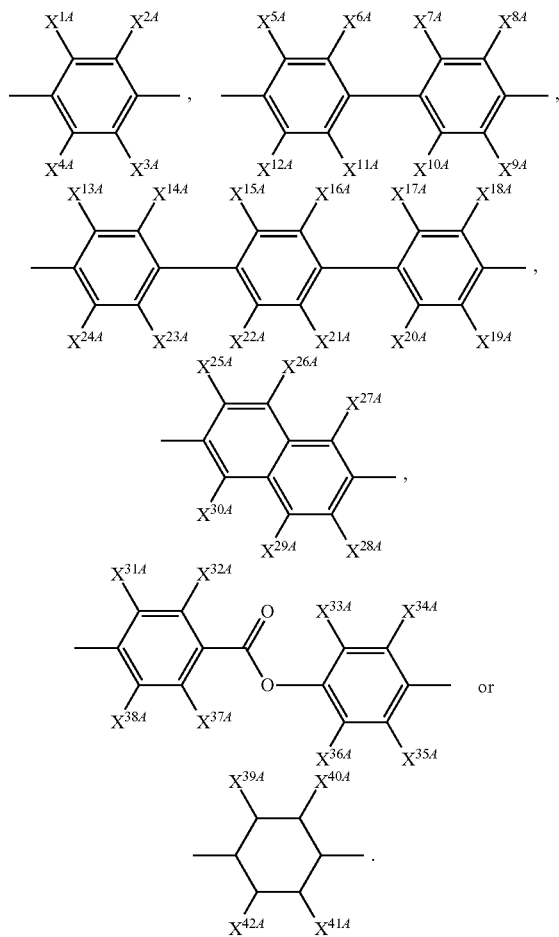

Ring B is the substituted or non-substituted aromatic ring. For example, Ring B may be

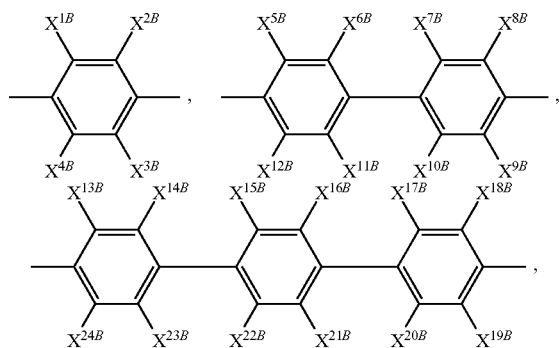

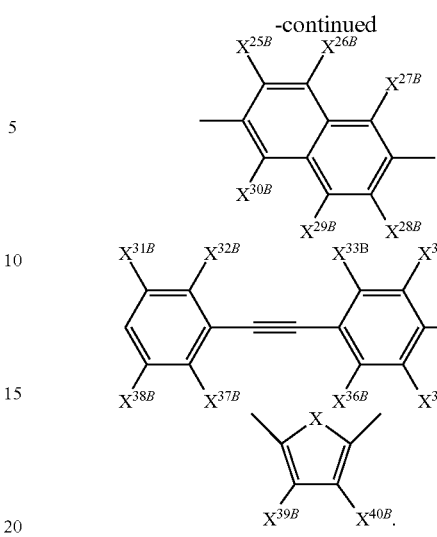

As represented by Chemical Formula 7, Ring A and Ring B are divalent groups. The term "non-substituted" used in Ring A and Ring B means that bonds except for those forming the divalent group are non-substituted. In the structures of Ring A and Ring B, a left bond of the bonds forming the divalent group is toward a backbone chain, and a right bond of the bonds forming the divalent group is toward a side chain or a terminal group. $X^{1A}$ to $X^{42A}$ of Ring A, and $X^{1B}$ to $X^{40B}$ of Ring B may each independently represent hydrogen, an alkyl group, an alkoxy group, a cyano group, a nitro group or a halogen atom, and may include, for example, the alkoxy group. X may be a nitrogen atom, an oxygen atom or a sulfur atom. Ring A and Ring B may each include one or at least two substitution groups. An exemplary number of substitution in Ring A or Ring B may be 1.

In the Chemical Formulae 7 and 8 above, the alkyl group may be independently a C1 to C12 alkyl group, for example, C1 to C6 alkyl group, more preferably, a methyl group. The alkoxy group may be independently C1 to C12 alkoxy group, for example, C1 to C6 alkoxy group, more preferably a methoxy group. The halogen atom may be a fluorine atom, a chlorine atom, a bromine atom or an iodine atom, for example, the fluorine atom.

A weight average molecular weight of the binder resin included in the separation layer may be in a range from about 5,000 to about 200,000, for example, from about 10,000 to about 100,000.

The melamine-based curing agent of the separation layer according to example embodiments of the present invention may form a chemical bond with the first protection layer because a non-reacted melamine-based curing agent may exist even though the melamine-based curing agent is added by a theoretic reaction equivalent amount.

In some implementation, for example, the melamine-based curing agent may be included in an excess amount relative to an equivalent amount of the binder resin represented by Chemical Formulae 7 and 8 in an aspect of sufficiently achieving the chemical bond with the first protection layer. Accordingly, the non-reacted melamine-based curing agent may easily create the chemical bond with the first protection layer.

For example, an amount of the melamine-based curing agent may be at least about 120% relative to the equivalent amount of the binder resin. Preferable effects of the present inventive concepts may be efficiently obtained from the above range. An upper limit of the amount of the melamine-based curing agent may not be specifically limited. However, the upper limit may be about 250% relative to the equivalent amount of the binder resin in an aspect of productivity and an amount of a polymer in the first protection layer.

If the amount of the melamine-based curing agent exceeds about 250% relative to the equivalent amount of the binder resin, a coating property and a transmittance may be degraded.

A thickness of the separation layer may be in a range from about 10 nm to about 1,000 nm, for example, from about 50 nm to about 500 nm. If the thickness of the separation layer is less than about 10 nm, a coating uniformity may be reduced to cause an irregular formation of electrode patterns. A local peeling force may be also increased to cause tearing, and a curl of a film touch sensor after detaching from the carrier substrate may not be controlled. If the thickness of the separation layer exceeds about 1,000 nm, the peeling force may not be further reduced and a film flexibility may be degraded.

First Protection Layer

The first protection layer may be disposed on the separation layer, and may also coat the electrode pattern layer together with the separation layer to prevent a contamination and a fracture of the electrode pattern layer during the detaching process from the carrier substrate.

The first protection layer according to example embodiments of the present invention may be formed from a composition for the first protection layer which may include a polymer containing at least one of a hydroxyl group, a carboxyl group or an amide group.

According to example embodiments of the present invention, the polymer of the first protection layer may form a chemical bond with the alkoxy group contained in the melamine-based curing agent of the separation layer to improve an interlayer adhesion, flexibility and mechanical strength.

Specifically, hydrogen of the alkoxy group included in the melamine-based curing agent, and the hydroxyl group, the carboxyl group or the amide group included in the polymer of the first protection layer may be reacted by dehydration in a hydrolysis condition so that water may be removed while forming the chemical bond between the melamine-based curing agent and the polymer of the first protection layer. Thus, an adhesion between the separation layer and the first protection layer may be improved so that electrode damages and cracks may be prevented during a detaching process from the carrier substrate.

The polymer of the first protection layer may include a polymer including at least one from repeating units represented by Chemical Formula 9 or 10.

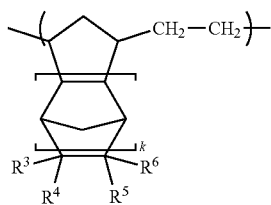

[Chemical Formula 9]

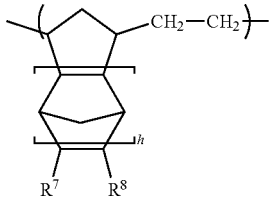

[Chemical Formula 10]

(In the Chemical Formulae above, at least one of $R^3$ to $R^6$ is -Hn-$Y_1$, n is 0 or 1, H is a C1 to C6 alkylene group or a carbonyl group, $Y_1$ is a protic polar group, remaining ones of $R^3$ to $R^6$ except for the at least one are hydrogen or -Hn-$Y_2$, $Y_2$ is a C1 to C6 alkyl group, a C6 to C12 aryl group or a protic polar group, $Y_2$ is capable of being substituted with a C1 to C4 alkyl group or a C6 to C12 aryl group, $R^7$ and $R^8$ are connected to each other to form a three-membered or five-membered hetero ring capable of being substituted with a C1 to C4 alkyl group or a C6 to C12 aryl group, k is an integer from 0 to 2, h is an integer from 0 to 2, and the protic polar groups are each independently a hydroxyl group, a carboxyl group or an amide group).

The hetero ring indicates a cyclic structure including at least one hetero atom (N, O, P, S, etc.) in the ring.

In the Chemical Formula 10 above, the three-membered hetero ring formed by $R^7$ and $R^8$ may include, e.g., an epoxy structure. The five-membered hetero ring formed by $R^7$ and $R^8$ may include, e.g., a dicarboxylic acid anhydride structure (—C(O)—O—C(O)—), a dicarboxy imide structure (—C(O)—N—C(O)—), etc.

The polymer including the repeating unit represented by Chemical Formula 9 or 10 may have a high glass transition temperature (Tg). For example, the glass transition temperature of the polymer may be at least 100° C., for example, at least 150° C., preferably at least 200° C., and more preferably at least 250° C. The first protection layer including the polymer of the high glass transition temperature may have a high heat-resistance so that wrinkles, cracks, discoloration occurring when high temperature deposition and annealing processes are performed for forming sensing electrodes such as ITO electrodes may be prevented.

The first protection layer may be a cured layer from the polymer including the repeating unit represented by Chemical Formula 9 or 10, and may have an improved elasticity to prevent cracks while performing the detaching process from the carrier substrate.

An elastic modulus of the first protection layer may be in a range from about 2.8 Gpa to about 4.5 Gpa. If the elastic modulus is less than about 2.8 Gpa, wrinkles may occur while forming the electrodes. If the elastic modulus exceeds about 4.5 Gpa, cracks may occur during the detaching process from the carrier substrate. The elastic modulus within the above-mentioned range may be achieved by, e.g., controlling a post-bake temperature to be at least 180° C.

For example, the elastic modulus may be in a range from about 3 Gpa to about 4.2 Gpa from an aspect of preventing the wrinkles and cracks.

Additionally, the first protection layer according to example embodiments may have a high transmittance. For example, the transmittance of the first protection layer may be at least 90%, for example, at least 95%, more preferably at least 97%. The transmittance within the above-mentioned range may be achieved by, e.g., controlling a post-bake temperature to be in a range from 180° C. to 250° C.

The polymer including the repeating unit represented by Chemical Formula 9 or 10 may be a cyclic olefin-based polymer containing a protic polar group.

The protic polar group may indicate an atomic group in which a hydrogen atom is directly bonded to an atom other than a carbon atom. For example, the protic polar group may include a hydroxyl group, a carboxyl group or an amide group, for example, may include the carboxyl group.

A weight average molecular weight (Mw) of the first protection layer may be in a range from about 1,000 to about 1,000,000, for example, from about 5,000 to about 150,000, more preferably from about 2,000 to about 10,000.

The composition for the protection layer may further include other optional ingredients without departing from the spirit and scope of the present inventive concepts. For example, the composition may include a resin component other than a cyclic olefin-based polymer, a solvent, a cross-linking agent, a compounding agent, etc.

The resin component other than the cyclic olefin-based polymer may include a styrene-based resin, a vinyl chloride-based resin, an acryl-based resin, a polyphenylene ether resin, a polyarylenesulfide resin, a polycarbonate resin, a polyester resin, a polyamide resin, a polyethersulfone resin, a polysulfone resin, a polyimide resin, a rubber, an elastomer, etc.

The solvent may include ethyleneglycol monoalkylether, diethyleneglycol dialkylether, ethyleneglycol alkylether acetate, alkyleneglycol alkylether acetate, propyleneglycol monoalkylether, propyleneglycol dialkylether, propyleneglycol alkylether propionate, butanediol monoalkylether, butanediol monoalkylether acetate, butanediol monoalkylether propionate, dipropyleneglycol dialkyletehr, an aromatic hydrocarbon, a ketone, an alcohol, an ester, a cyclic ester, etc. These may be used alone or in a combination thereof.

The cross-linking agent may contain at least two functional groups, for example, at least three functional groups that may be capable of reacting with the cyclic olefin-based polymer. The functional group of the cross-linking agent may include any group that may be reacted with a functional group or an unsaturated bond in the cyclic olefin-based polymer. If the cyclic olefin-based polymer has a protic polar group, the functional group capable of reacting with the polar group may include, e.g., an amino group, a carboxyl group, a hydroxyl group, an epoxy group, an isocyanate group, etc., for example, the amino group, the epoxy group or the isocyanate group, more preferably, the epoxy group.

The compounding agent may include, e.g., a sensitizer, a surfactant, a potential acid generator, an antistatic agent, an anti-oxidizing agent, an adhesive agent, a defoaming agent, a pigment, a dye, etc.

Electrode Pattern Layer

The electrode pattern layer may include a sensing electrode for sensing a touched area, and a pad electrode.

The sensing electrode may be disposed at a sensing region of the separation layer, and the pad electrode may be disposed at a pad region on the separation layer. In some embodiments, at least a portion of the sensing electrode may be disposed at the pad region, and at least a portion of the pad electrode may be disposed at the sensing region so that the sensing electrode and the pad electrode may be electrically connected to each other.

The sensing region may correspond to a display portion of the film touch sensor on which a touch is input. The pad region may correspond to a pad portion of the film touch sensor. Specifically, the sensing region of the separation layer may correspond to the display portion on the separation layer, and the pad region may correspond to the pad portion on the separation layer.

The sensing electrode and the pad electrode of the electrode pattern layer may include a conductive material. Non-limiting examples of the conductive material may include a metal oxide such as indium tin oxide (ITO), indium zinc oxide (IZO), indium zinc tin oxide (IZTO), aluminum zinc oxide (AZO), IZTO-silver (Ag)-IZTO or AZO-Ag-AZO; a metal such as gold (Au), Ag, copper (Cu), molybdenum (Mo), or APC (Ag-Palladium-Cu); a metal nanowire of gold, silver, copper or lead (Pb); a carbon-based material such as carbon nano-tube (CNT) or graphene; or a conductive polymer such as poly(3,4-ethylenedioxythiophene) (PEDOT) or polyaniline (PANI). These may be used alone or in a combination thereof. For example, crystalline or non-crystalline ITO may be used.

Unit patterns of the sensing electrode may be independently a polygonal pattern such as a triangle pattern, a quadrangle pattern, a pentagonal pattern, a hexagonal pattern, a heptagonal pattern, or more.

The sensing pattern may include regular patterns. The regular pattern may include patterns having a regular shape or a regular arrangement. For example, the unit patterns may independently include a rectangular or square mesh pattern, or a hexagonal pattern.

The sensing electrode may include irregular patterns. The irregular pattern may include patterns having an irregular or non-periodic shape.

If the sensing electrode is formed of the metal nanowire, the carbon-based material or the conductive polymer, the sensing electrode may have a network structure.

In the network structure, a signal may be sequentially transferred through patterns neighboring and contacting each other, so that a sensitivity of the patterns may be improved.

A thickness of the sensing electrode may not be specifically limited. The thickness of the sensing electrode may become smaller in consideration of a flexibility of the film touch sensor. For example, the thickness of the sensing electrode may be in a range from about 100 Å to about 500 Å. In some embodiments, a capping layer may be formed on the sensing electrode so that an excessive resistance increase caused by a thin-layered structure of the sensing electrode may be prevented.

The sensing electrodes of the electrode pattern layer may be arranged in two different directions, and electrodes of each direction are insulated from each other. In some embodiments, the electrode pattern layer may include an insulation layer, and electrodes arranged in one direction may be electrically connected to each other via a bridge electrode while being insulated from electrodes arranged in the other direction.

Insulation Layer

The insulation layer may be provided for more effectively insulating the unit patterns of the electrode pattern layer and protecting the electrode pattern layer.

An elastic modulus difference between the first protection layer and the insulation layer at 25° C. may be equal to or less than about 300 MPa, for example, equal to or less than about 100 Mpa. In this range, cracks caused by a stress-relieving capability deviation between different layers may be prevented. If the elastic modulus difference exceeds about 300 Mpa, an interlayer imbalance of strain energy and stress-relieving capability may become greater to cause cracks.

The elastic modulus may be measured at 25° C. so that cracks may be prevented in a user's environment.

The insulation layer may include an organic insulation material so that the elastic modulus difference with respect to the first protection layer may be equal to or less than about 300 Mpa. For example, the insulation layer may, for example, include a thermally curable or UV-curable organic polymer. The insulation layer may be formed of at least one of an epoxy compound, an acryl compound, a melamine compound, etc.

The insulation layer may also serve as an adhesive layer or a bonding layer. In this case, a substrate film may be directly attached on the insulation layer without using an additional adhesive or bonding agent.

Second Protection Layer

The film touch sensor according to example embodiments may optionally include a second protection layer on the first protection layer and the electrode pattern layer.

The second protection layer may serve as a substrate and a passivation layer. Further, the second protection layer may prevent a corrosion of the electrode pattern layer, and may serve as a planarizing layer so that microbubbles may be prevented when being combined with the substrate film. The second protection layer may also serve as an adhesive layer.

The substrate film may be protected by the first and second protection layers so that cracks may be effectively reduced or avoided.

The second protection layer may be formed of a silicon-based polymer such as polydimethylsiloxane (PDMS), polyorganosiloxane (POS), etc.; a polyimide-based polymer; a polyurethane-based polymer, or the like, to serve as the substrate and the passivation layer. These may be used alone or in a combination thereof.

The second protection layer may include a thermally curable or photo-curable adhesive or bonding agent commonly known in the related art to serve as the adhesive layer. For example, the second protection layer may be formed of polyester-based, polyether-based, urethane-based, epoxy-based, silicone-based, acryl-based thermally curable or photo-curable adhesive materials.

In some embodiments, the second protection layer may be formed of the same composition as that for the first protection layer.

Substrate Film

The film touch sensor according to example embodiments may further include a substrate film attached to an upper portion of the film touch sensor over the electrode pattern layer.

The substrate film may include a transparent film commonly used in the related art. For example, the substrate film may include at least one of cellulose ester (e.g., cellulose triacetate, cellulose propionate, cellulose butyrate), polyether ketone, polyvinyl alcohol or polyvinyl chloride.

The transparent film may be an optical isotropic film or a retardation film.

In the optical isotropic film, an In-Plane retardation value (Ro, Ro=$[(nx-ny) \times d]$, nx and ny are main refractive indexes in a film plane, nz is a refractive index along a thickness direction of the film, and d is a thickness of the film) is equal to or less than 40 nm, for example, equal to or less than 15 nm. A retardation value in the thickness direction (Rth, Rth=$[(nx+ny)/2-nz] \times d$) is in a range from −90 nm to +75 nm, for example, from −80 nm to +60 nm, specifically from −70 nm to +45 nm.

The retardation film may be formed by a uniaxial stretching, a biaxial stretching, a polymer coating, or a liquid crystal coating. The retardation film may be utilized for improving and controlling optical properties such as a viewing angle, a color property, a light leakage, etc.

In some embodiments, a polarizing plate may be used as the substrate film.

The polarizing plate may include a polyvinyl alcohol-based polarizer and a protective film attached on at least one surface of the polarizer.

In some embodiments, a protective film may be used as the substrate film.

The protective film may include an adhesive layer formed on at least one surface of a polymer film, or may be a film having a self-adhesive property such as a polypropylene film. The protective layer may be employed for protecting a surface of the touch sensor and improving productivity.

A light transmittance of the substrate film may be at least about 85%, for example, at least about 90%. A total haze of the substrate film which is measured according to JIS K7136 standard may be equal to or less than about 10%, for example, equal to or less than about 7%.

A thickness of the substrate film may not be specifically limited. For example, the thickness of the substrate film may be in a range from about 30 μm to about 150 μm, for example, from about 70 μm to about 120 μm.

The substrate film may be combined using an adhesive layer. The adhesive layer may also include a bonding layer.

A thermally curable or photo-curable adhesive commonly known in the related art may be used. For example, polyester-based, polyether-based, urethane-based, epoxy-based, silicone-based, acryl-based thermally curable or photo-curable adhesives may be used.

The film touch sensor according to example embodiments may further include a passivation layer between the electrode pattern layer and the substrate film.

The passivation layer may be formed to prevent a contamination from an external environment (moisture, air, etc.)

The passivation layer may be formed as a desired pattern using, e.g., silicon oxide, a transparent acryl-based resin composition, a thermally curable resin composition, etc.

A thickness of the passivation layer may be properly adjusted. The thickness of the passivation layer may be about 2,000 nm or less.

<Touch Screen Panel and Image Display Device>

Example embodiments of the present invention provide a touch screen panel including the film touch sensor. The touch screen panel may have improved flexibility and durability to be effectively employed in a flexible display device.

Further, example embodiments of the present invention provide an image display device including the film touch sensor.

The film touch sensor may be employed in a conventional liquid crystal display device, and also employed in various display devices such as an electro-luminescence device, a plasma display device, a field emission display device, etc.

The film touch sensor according to example embodiments of the present invention may have improved bending property, so that the image display device may be the flexible display device.

Hereinafter, exemplary embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

SYNTHESIS EXAMPLE 1

Synthesis of Binder Resin of Chemical Formula 7

(1) Synthesis of 4-(6-hydroxyhexyl oxy)benzoic acid

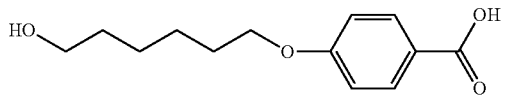

100.0 g of 4-hydroxy benzoic acid (0.7 mol), 105.1 g of potassium hydroxide (1.6 mol) were dissolved in 400.0 g of water. 108.8 g of 6-chlorohexanol (0.8 mol) was added in the solution for an hour, and then the solution was heated to 100° C. and refluxed. After 20 hours, the reaction mixture was cooled, stirred vigorously, and 344.6 g of 35% hydrochloric acid (1.7 mol) was dropped at a room temperature. Precipitated solids were collected and re-crystallized with 400 g of tetrahydrofuran (THF), and 120.0 g of the compound (0.5 mol) represented by the above formula was obtained as a white solid.

(2) Synthesis of 4-[6-(2-methyl acryloyl oxy)hexyloxy]benzoic acid

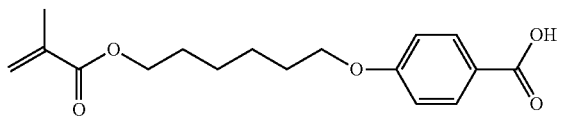 [SMILES: C=C(C)C(=O)OCCCCCCOc1ccc(C(=O)O)cc1]

120.0 g of the compound (0.5 mol) obtained from the above (1) and 81.5 g of trimethylamine (0.8 mol) were dissolved in 480.0 g of THF. 84.2 g of methacrylic acid (0.8 mol) was added in the solution for an hour, and then heated to 40° C. After 4 hours, the reaction mixture was cooled, and 240.0 g of water was added. An organic layer was separated, and 367.2 g of 10% hydrochloric acid (1 mol) was added thereto and stirred. The organic layer was concentrated, and a residue was re-crystallized with 400.0 g of toluene to obtain 96.0 g of the compound (0.3 mol) represented by the above formula as a white solid.

(3) Synthesis of 4-[6-(2-methyl acryloyl oxy)hexyloxy]thio benzoic acid S-4-(methoxy)phenyl ester

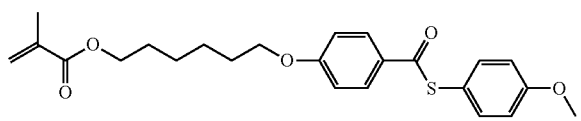 [SMILES: C=C(C)C(=O)OCCCCCCOc1ccc(C(=O)Sc2ccc(OC)cc2)cc1]

96.0 g of the compound (0.3 mol) obtained from the above (2), 42.1 g of 4-methoxythio phenol (0.3 mol) and 7.7 g of N,N-dimethylamino pyridine (0.1 mol) were dissolved in 960 g of dichloromethane. 71.1 g of dicyclohexyl carbodiimide (DCC) (0.3 mol) was added to the solution. After reacting for 2 hours at a room temperature, 288 g of water was added. An organic layer was separated and concentrated. A residue was re-crystallized with 100 g of toluene to obtain 110 g the compound (0.3 mol) represented by the above formula as a white solid.

(4) Synthesis of poly[1-[6-[4-[4-(methoxy)phenylthio carbonyl]phenoxy]hexyloxycarbonyl]-1-methylethylene]

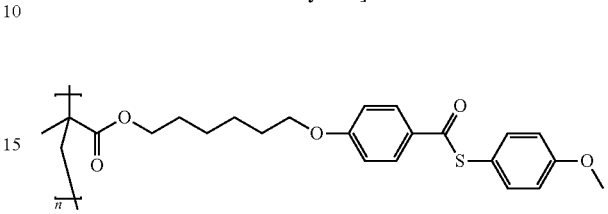

110 g of the compound (0.2 mol) obtained from the above (3) and 0.8 g of AIBN (5 mM) were dissolved in 412 g of cyclohexanone. The solution was aerated with nitrogen for an hour, and then heated to 80° C. After 10 hours, the reaction mixture was cooled, vigorously stirred and dropped in 346 g of n-hexane at a room temperature. A polymer was separated, filtered and dried at 50° C. under reduced pressure to obtain 93.5 g of the polymer represented by the above formula.

A weight average molecular weight (Mw) was measured using a gel permeation chromatography (GPC). The measured value of Mw was 21,000.

SYNTHESIS EXAMPLE 2

Synthesis of Binder Resin Represented by Chemical Formula 8

(1) Poly[1-[6-[4-[4-(E)-2-methoxycarbonyl vinyl]phenoxycarbonyl]phenoxy]hexyloxycarbonyl]-1-methylethylene-CO-1-[6-[4-carboxyphenoxy]hexyloxycarbonyl]-1-methylethylene] (M1:M2=90:10)

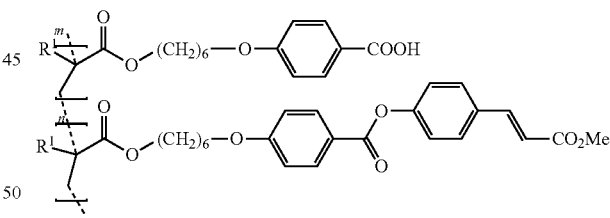

g of 4-6-(2-methylacryloyloxy)hexyloxy]benzoic acid 4-[(E)-2-methoxylcarbonylvinyl]phenylester (11 mM), 29.6 g of 4-[6-(2-methylacryloyloxy)hexyloxy]benzoic acid (96 mM), and 0.35 g of 2,2'-azobisisobutyronitrile (2.1 mM) were dissolved in 196 g of cyclohexanone. The solution was aerated with nitrogen for an hour, and then heated at 80° C. After 10 hours, the reaction mixture was cooled, vigorously stirred and dropped in 346 g of n-hexane at a room temperature. A polymer was separated, filtered and dried at 50° C. under reduced pressure to obtain 26 g of the polymer represented by the above formula.

A weight average molecular weight (Mw) of the polymer was measured with a GPC using polystyrene as a standard material. Mw and acid value of the polymer were measured to be 30,700 and 156 mgKOH/g, respectively.

(2) Poly[1-[6-[4-[4-[(E)-2-methoxycarbonylvinyl]phenoxycarbonyl]phenoxy]hexyloxycarbonyl]-1-methylethylene-CO-1-[6-[4-carboxyphenoxy]hexyloxycarbonyl]-1-methylethylene](M1:M2=80:20)

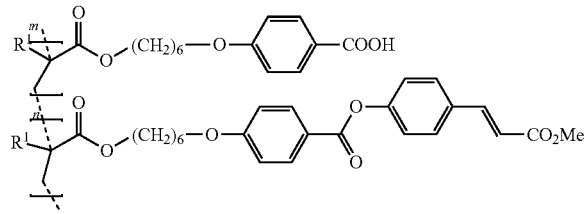

Processes the same as those described in the above (1) were performed except that 8 g of 4-6-(2-methylacryloyloxy)hexyloxy]benzoic acid 4-[(E)-2-methoxylcarbonylvinyl]phenylester (17 mM), 21 g of 4-[6-(2-methylacryloyloxy)hexyloxy]benzoic acid (69 mM), 0.28 g of 2,2'-azobisisobutyronitrile (1.7 mM) and 116 g of cyclohexanone were used to obtain 24 g of the polymer represented by the above formula. Mw and acid value of the polymer were 31,700 and 130 mgKOH/g, respectively.

(3) Poly[1-[6-[4-[4-[(E)-2-methoxycarbonylvinyl]phenoxycarbonyl]phenoxy]hexyloxycarbonyl]-1-methylethylene-CO-1-[6-[4-carboxyphenoxy]hexyloxycarbonyl]-1-methylethylene] (M1:M2=70:30)

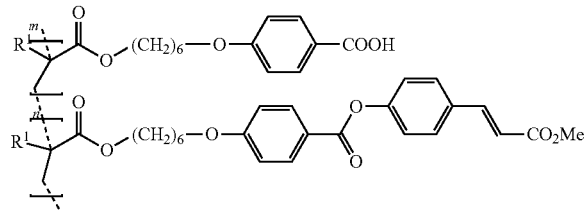

Processes the same as those described in the above (1) were performed except that 10 g of 4-6-(2-methylacryloyloxy)hexyloxy]benzoic acid 4-[(E)-2-methoxylcarbonylvinyl]phenylester (21 mM), 15.3 g of 4-[6-(2-methylacryloyloxy)hexyloxy]benzoic acid (50 mM), 0.23 g of 2,2'-azobisisobutyronitrile (1.4 mM) and 101.2 g of cyclohexanone were used, and 253 g of n-hexane was used to obtain 24 g of the polymer represented by the above formula. Mw and acid value of the polymer were 33,300 and 110 mgKOH/g, respectively.

(4) Poly[1-[6-[4-[4-[(E)-2-methoxycarbonylvinyl]phenoxycarbonyl]phenoxy]hexyloxycarbonyl]-1-methylethylene-CO-1-[6-[3-fluoro-4-carboxyphenoxy]hexyloxycarbonyl]-1-methylethylene] (M1:M2=81:19)

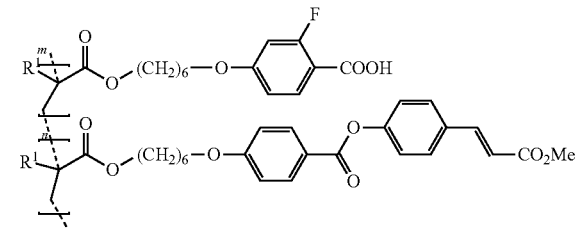

Processes the same as those described in the above (1) were performed except that 2 g of 4-6-(2-methylacryloyloxy)hexyloxy]benzoic acid 4-[(E)-2-methoxylcarbonylvinyl]phenylester (4 mM), 5.6 g of 2-fluoro-4-[6-(2-methylacryloyloxy)hexyloxy]benzoic acid (17 mM), 0.11 g of 2,2'-azobisisobutyronitrile (0.6 mM) and 116 g of cyclohexanone were used, and 76 g of n-hexane was used to obtain 5 g of the polymer represented by the above formula. Mw and acid value of the polymer were 48,200 and 132 mgKOH/g, respectively.

(5) Poly[1-[6-[4-[(E)-2-[4-cyanophenoxy]carbonylvinyl]phenoxy]hexyloxycarbonyl]-1-methylethylene-CO-1-[6-[4-carboxyphenoxy]hexyloxycarbonyl]-1-methylethylene] (M1:M2=80:20)

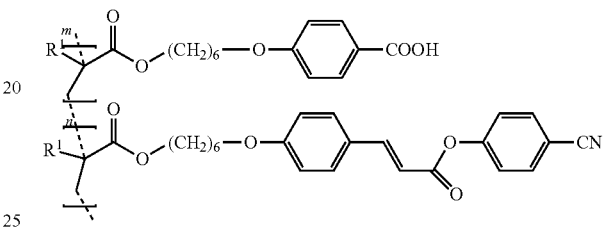

Processes the same as those described in the above (1) were performed except that 23 mM of 4-6-(2-methylacryloyloxy)hexyloxy]-(E)cinnamic acid 4-cyanophenyl ester, 28 g of 4-[6-(2-methylacryloyloxy)hexyloxy]benzoic acid (92 mM), 0.38 g of 2,2'-azobisisobutyronitrile (2.3 mM) and 153 g of cyclohexanone were used to obtain 22 g of the polymer represented by the above formula.

Mw and acid value of the polymer were 24,800 and 135 mgKOH/g, respectively.

SYNTHESIS EXAMPLE 3

Synthesis of Polymer (Including Carboxyl Group) for First Protection Layer 60 weight parts of 8-hydroxycarbonyltetracyclododecene, weight parts of N-phenyl-(5-norbornene-2,3-dicarboxyimide), 1.3 weight parts of 1-hexene, 0.05 weight parts of (1,3-dimethylimidazolidine-2-ylidene) (tricyclohexylphosphine)benzylidene ruthenium dichloride, and 400 weight parts of tetrahydrofuran were introduced and reacted in a nitrogen substituted glass reactor while being stirred at 70° C. for 2 hours to obtain a resin solution (a) (a solid content: about 20%). The resin solution (a) was moved to an autoclave equipped with an agitator, and reacted at 150° C. for 5 hours under a hydrogen pressure of 4 MPa to obtain a resin solution (b) (a solid content: about 20%) including a hydrogen-added resin (a hydrogen addition ratio: 99%). Next, 100 weight parts of the resin solution (b) and 1 weigh part of an activated carbon powder was introduced in a heat-resistant autoclave, and reacted at 150° C. for 3 hours under a hydrogen pressure of 4 MPa. After completion of the reaction, a reaction solution was filtered using a fluorine resin with a hole diameter of 0.2 μm to separate the activated carbon and obtain a resin solution (c-1). The reaction solution was well filtered. The resin solution (c-1) was added in ethyl alcohol. The resultant fraction was dried to form a resin (1). Mw of the resin (1) by a polyisoprene conversion was 5,500, and Mn was 3,200. An acid value was 50 mgKOH/g.

0.5 weight part of an additive (F-554, manufactured by DIC) and 2.5 weight parts of a curing agent (EPHE-3150CE, manufactured by Dicel) were added in the resin solution (c-1) and a resin composition for protection layer with a solid content of 20% was prepared to form a first protection layer (B-1).

SYNTHESIS EXAMPLE 4

Synthesis of Polymer (Including Hydroxyl Group) for First Protection Layer

A flask equipped with a stirrer, a thermometer, a reflux cooling pipe, a dropping lot and a nitrogen providing pipe was prepared, and then 80 weight parts of propylene glycol mono-methyl ether acetate (PGMEA) was input, stirred and heated to 75° C. 20 weight parts of hydroxyethyl (meth) acrylate (HEMA), 50 weight parts of vinyl toluene (VT), and 30 weight parts of methacrylic acid were dissolved in 170 weight parts of PGMEA to form a solution. The solution was dropped in the flask through the dropping lot for 5 hours.

A solution including 20 weight parts of azobisisobutyronitrile as a polymerization initiator dissolved in 80 weight parts of PGMEA was dropped for 5 hours through an additional dropping lot. After the completion of adding the polymerization initiator, the temperature was maintained for about 4 hours, and cooled to a room temperature to obtain a resin solution (c-2) having 33.6 wt % of a solid content and 19,740 of Mw. 0.5 weight part of an additive (F-554, manufactured by DIC) and 2.5 weight parts of a curing agent (EPHE-3150CE, manufactured by Dicel) were added in the resin solution (c-2), and a resin composition for protection layer with a solid content of 20% was prepared to form a first protection layer (B-2).

SYNTHESIS EXAMPLE 5

Synthesis of Polymer (Including Amide Group) for First Protection Layer

A process the same as that of Synthesis Example 4 was performed except that acrylic acid amide was used instead of 20 weight parts of hydroxyethyl (meth)acrylate (HEMA) to form a resin solution (c-3) having 28.9 wt % of a solid content and 25,300 of Mw. 0.5 weight part of an additive (F-554, manufactured by DIC) and 2.5 weight parts of a curing agent (EPHE-3150CE, manufactured by Dicel) were added in the resin solution (c-3), and a resin composition for protection layer with a solid content of 20% was prepared to form a first protection layer (B-3).

EXAMPLES AND COMPARATIVE EXAMPLES (1) Composition for Separation Layer
Compositions for separation layer having components and contents as shown in Table 1 below were prepared.

TABLE 1

| | Curing Agent | Binder Resin B1 | Binder Resin B2 | Solvent D1 | Solvent D2 | Additive |
|---|---|---|---|---|---|---|
| Example 1 | M1 | 28 | — | 190 | 1700 | 10 |
| Example 2 | | 24 | — | 76 | 190 | 1700 | 10 |
| Example 3 | M1 | 45 | 55 | — | 190 | 1700 | 10 |
| Example 4 | | 40 | — | 60 | 190 | 1700 | 10 |
| Example 5 | M1 | 25 | 75 | — | 190 | 1700 | 10 |
| Example 6 | | 21 | — | 79 | 190 | 1700 | 10 |
| Example 7 | M2 | 30 | 70 | — | 190 | 1700 | 10 |
| Example 8 | | 25 | — | 75 | 190 | 1700 | 10 |
| Example 9 | M2 | 47 | 53 | — | 190 | 1700 | 10 |
| Example 10 | | 42 | — | 58 | 190 | 1700 | 10 |
| Example 11 | M2 | 26 | 74 | — | 190 | 1700 | 10 |
| Example 12 | | 22 | — | 78 | 190 | 1700 | 10 |
| Example 13 | M3 | 33 | 67 | — | 190 | 1700 | 10 |
| Example 14 | | 28 | — | 72 | 190 | 1700 | 10 |
| Example 15 | M3 | 50 | 50 | — | 190 | 1700 | 10 |
| Example 16 | | 45 | — | 55 | 190 | 1700 | 10 |
| Example 17 | M3 | 29 | 71 | — | 190 | 1700 | 10 |
| Example 18 | | 25 | — | 75 | 190 | 1700 | 10 |
| Example 19 | M4 | 26 | 74 | — | 190 | 1700 | 10 |
| Example 20 | | 22 | — | 78 | 190 | 1700 | 10 |
| Example 21 | M4 | 43 | 57 | — | 190 | 1700 | 10 |
| Example 22 | | 38 | — | 62 | 190 | 1700 | 10 |
| Example 23 | M4 | 23 | 77 | — | 190 | 1700 | 10 |
| Example 24 | | 19 | — | 81 | 190 | 1700 | 10 |
| Example 25 | M5 | 33 | 67 | — | 190 | 1700 | 10 |
| Example 26 | | 29 | — | 71 | 190 | 1700 | 10 |
| Example 27 | M5 | 51 | 49 | — | 190 | 1700 | 10 |
| Example 28 | | 46 | — | 54 | 190 | 1700 | 10 |
| Example 29 | M5 | 29 | 71 | — | 190 | 1700 | 10 |
| Example 30 | | 25 | — | 75 | 190 | 1700 | 10 |
| Example 31 | M6 | 28 | 72 | — | 190 | 1700 | 10 |
| Example 32 | | 24 | — | 76 | 190 | 1700 | 10 |
| Example 33 | M6 | 45 | 55 | — | 190 | 1700 | 10 |
| Example 34 | | 40 | — | 60 | 190 | 1700 | 10 |
| Example 35 | M6 | 25 | 75 | — | 190 | 1700 | 10 |
| Example 36 | | 21 | — | 79 | 190 | 1700 | 10 |
| Comparative Example 1 | M7 | 28 | 72 | — | 190 | 1700 | 10 |
| Comparative Example 2 | | 24 | — | 76 | 190 | 1700 | 10 |
| Comparative Example 3 | M7 | 45 | 55 | — | 190 | 1700 | 10 |
| Comparative Example 4 | | 40 | — | 60 | 190 | 1700 | 10 |
| Comparative Example 5 | M7 | 25 | 75 | — | 190 | 1700 | 10 |
| Comparative Example 6 | | 21 | — | 79 | 190 | 1700 | 10 |
| Comparative Example 7 | M8 | 28 | 72 | — | 190 | 1700 | 10 |
| Comparative Example 8 | | 24 | — | 76 | 190 | 1700 | 10 |
| Comparative Example 9 | M8 | 45 | 55 | — | 190 | 1700 | 10 |
| Comparative Example 10 | | 40 | — | 60 | 190 | 1700 | 10 |
| Comparative Example 11 | M8 | 25 | 75 | — | 190 | 1700 | 10 |
| Comparative Example 12 | | 21 | — | 79 | 190 | 1700 | 10 |
| Comparative Example 13 | M9 | 28 | 72 | — | 190 | 1700 | 10 |
| Comparative Example 14 | | 24 | — | 76 | 190 | 1700 | 10 |
| Comparative Example 15 | M9 | 45 | 55 | — | 190 | 1700 | 10 |
| Comparative Example 16 | | 40 | — | 60 | 190 | 1700 | 10 |
| Comparative Example 17 | M9 | 25 | 75 | — | 190 | 1700 | 10 |
| Comparative Example 18 | | 21 | — | 79 | 190 | 1700 | 10 |

1. Curing Agent

M1: a melamine-based curing agent represented by Chemical Formula 1

M2: a melamine-based curing agent represented by Chemical Formula 2

M3: a melamine-based curing agent represented by Chemical Formula 3

M4: a melamine-based curing agent represented by Chemical Formula 4

M5: a melamine-based curing agent represented by Chemical Formula 5

M6: a melamine-based curing agent represented by Chemical Formula 6 (n=15)

M7: a radical-based curing agent (V-65: manufactured by Wako)

M8: a cation-based curing agent (Irgacure 250: manufactured by BASF)

M9: a triazine-based curing agent (MP-triazine: manufactured by Sanwa Chemical)

2. Binder Resin

B1: a binder resin manufactured by Synthesis Example 1

B2: a binder resin manufactured by Synthesis Example 2

3. Solvent

D1: diacetone alcohol

D2: propylene glycol methyl ether

4. Additive

SH-8400 (manufactured by Shinetsu Chemical)

(2) Film Touch Sensor

A soda lime glass having a thickness of 700 μm was used as a carrier substrate. Compositions for separation layer of Examples and Comparative Examples were coated on the carrier substrate to have a thickness of 300 nm, and dried at 150° C. for 30 minutes to form separation layers.

17 weight parts of polymers according to one of Synthesis Examples 3 to 5, 79.5 weight parts of diethylene glycol methyl ethyl ether as a solvent, and 0.5 weight part of F-554 (manufactured by DIC) and 2.5 weight parts of EPHE-3150CE (manufactured by Dicel) as additives were mixed, diluted by a solvent with a solid content of 23 weight %, and stirred to form a composition for a first protection layer. The composition was coated on the separation layer using a spin coater to have a thickness of 2 μm, and pre-baked in a convection oven at 110° C. for 2 minutes. A post-baking process was further performed at 230° C. for 30 minutes to form a first protection layer.

Next, an ITO layer having a thickness of 0.05 μm was formed on the first protection layer, and a photo-sensitive resist was coated on the ITO layer to form an electrode pattern layer.

A second protection layer was formed on the first protection layer on which the electrode pattern layer was formed. An acryl-based adhesive layer was formed on the second protection layer, and then a polycarbonate substrate having a thickness of 50 μm was attached to obtain a film touch sensor.

Experimental Example (1) Evaluation of Adhesion

A separation layer and a first protection layer were formed on a soda lime glass having a thickness of 700 μm according to a method the same as that in Examples and Comparative Examples. 100 rooms were drawn in an 1 cm×1 cm room on the obtained substrate according to an ASTM D3359 standard, and then a detaching test using an adhesion measuring tape (3M, 610) was performed three times. The results were listed in Tables 2 to 7 below.

5B: A coating layer was not damaged at a cutting edge, and a detachment of the coating layer in a lattice was not observed.

4B: A coating layer was slightly damaged at a cutting edge, and a detachment in a lattice was observed within a range less than 5%.

3B: A detachment and a breakage were observed at a cutting edge, and a detachment in a lattice was observed within a range less than 15%.

2B: A detachment and a breakage were observed at a lattice, and a detachment in the lattice was observed within a range from 15% to 35%.

1B: A detachment in a form of a large ribbon occurred, and a detachment in the lattice was observed within a range from 35% to 65%.

0B: A detachment in the lattice over an area greater than 65% was observed. Adhesion failure (2) Measurement of Transmittance A separation layer and a first protection layer were formed on a soda lime glass having a thickness of 700 μm according to a method the same as that in Examples and Comparative Examples. A light transmittance at a wavelength of 550 nm of the insulation layer was measured using a spectrophotometer (U3210, manufactured by Hitachi Seisakusyo). The result was listed in Tables 2 to 7 below.

(3) Resistance to ITO.

A separation layer and a first protection layer were formed on a soda lime glass carrier substrate having a thickness of 700 μm according to a method the same as that in Examples and Comparative Examples. An ITO layer was formed with a thickness of 1,000 Å by a sputtering process on the insulation layer, and then a wrinkle of layer was observed. The result was listed in Tables 2 to 7 below.

○: No wrinkle was observed

X: Wrinkles occurred.

(4) Etching Resistance

A separation layer and a first protection layer were formed on a soda lime glass carrier substrate having a thickness of 700 μm according to a method the same as that in Examples and Comparative Examples, and then were immersed in an ITO etchant solution (MA-S02, manufactured by DONG-WOO FINE-CHEM) at 60° C. for 10 minutes. Thicknesses of layers before and after the immersion were measured, and the etching resistance was evaluated as a thickness percentage after the immersion. The result was listed in Tables 2 to 7 below.

○: greater than 98%

Δ: 95%~98%

X: less than 95%

(5) Solvent Resistance

A separation layer and a first protection layer were formed on a soda lime glass carrier substrate having a thickness of 700 μm according to a method the same as that in Examples and Comparative Examples, and then were immersed in an propylene glycol monomethyl ether acetate, and heated at 100° C. for 30 minutes. Thicknesses of layers before and after the immersion were measured, and the solvent resistance was evaluated as a thickness percentage after the immersion. The result was listed in Tables 2 to 7 below.

○: greater than 98%

Δ: 95%~98%

X: less than 95%

(6) Thermal Stability

A separation layer and a first protection layer were formed on a soda lime glass carrier substrate having a thickness of 700 μm according to a method the same as that in Examples and Comparative Example. A heating was further performed at 230° C. for 20 minutes, and then a transmittance change before and after the heating was measured. The result was listed in Tables 2 to 7 below.

◯: less than 3 ⊿T %
Δ: 4~8 ⊿T %
X: greater than 9 ⊿T %

(7) Evaluation of Cracks (Delamination/Cracks)

The film touch sensors according to Examples and Comparative Examples were cut by 100 mm×10 mm, and were subjected to bendings (10,000 times) using a bending tester apparatus (JIRBT-210, Juniltech). Crack occurrence in the film touch sensors was visually observed. The result was listed in Tables 2 to 7 below.

<Evaluation Standard>
◯: No crack was observed
Δ: Fine cracks occurred
X: Fracture of the film touch sensor was observed

TABLE 2

|  | Adhesion (B-1) | Cracks (B-1) | Thermal Stability (⊿T %) (B-1) | Solvent Resistance (B-1) | Resistance to ITO (B-1) | Etching Resistance (B-1) |
|---|---|---|---|---|---|---|
| Example 1 | 5B | ◯ | 2 | ◯ | ◯ | ◯ |
| Example 2 | 5B | ◯ | 1 | ◯ | ◯ | ◯ |
| Example 3 | 5B | ◯ | 0.5 | ◯ | ◯ | ◯ |
| Example 4 | 5B | ◯ | 0.8 | ◯ | ◯ | ◯ |
| Example 5 | 5B | ◯ | 2.5 | ◯ | ◯ | ◯ |
| Example 6 | 5B | ◯ | 1.2 | ◯ | ◯ | ◯ |
| Example 7 | 5B | ◯ | 2.2 | ◯ | ◯ | ◯ |
| Example 8 | 5B | ◯ | 1.5 | ◯ | ◯ | ◯ |
| Example 9 | 5B | ◯ | 1.2 | ◯ | ◯ | ◯ |
| Example 10 | 5B | ◯ | 1.1 | ◯ | ◯ | ◯ |
| Example 11 | 5B | ◯ | 1.8 | ◯ | ◯ | ◯ |
| Example 12 | 5B | ◯ | 1.5 | ◯ | ◯ | ◯ |
| Example 13 | 5B | ◯ | 1.5 | ◯ | ◯ | ◯ |
| Example 14 | 5B | ◯ | 1.8 | ◯ | ◯ | ◯ |
| Example 15 | 5B | ◯ | 1.2 | ◯ | ◯ | ◯ |
| Example 16 | 5B | ◯ | 1.5 | ◯ | ◯ | ◯ |
| Example 17 | 5B | ◯ | 2 | ◯ | ◯ | ◯ |
| Example 18 | 4B | ◯ | 1.5 | ◯ | ◯ | ◯ |
| Example 19 | 5B | ◯ | 1.8 | ◯ | ◯ | ◯ |
| Example 20 | 5B | ◯ | 1.4 | ◯ | ◯ | ◯ |
| Example 21 | 5B | ◯ | 1.2 | ◯ | ◯ | ◯ |
| Example 22 | 5B | ◯ | 1.3 | ◯ | ◯ | ◯ |
| Example 23 | 5B | ◯ | 3.2 | ◯ | ◯ | ◯ |
| Example 24 | 4B | ◯ | 3.5 | ◯ | ◯ | ◯ |
| Example 25 | 4B | ◯ | 2.8 | ◯ | ◯ | ◯ |
| Example 26 | 4B | ◯ | 3.2 | ◯ | ◯ | ◯ |
| Example 27 | 5B | ◯ | 2.3 | ◯ | ◯ | ◯ |
| Example 28 | 5B | ◯ | 2.5 | ◯ | ◯ | ◯ |
| Example 29 | 3B | ◯ | 2.5 | ◯ | ◯ | ◯ |
| Example 30 | 5B | ◯ | 2.8 | ◯ | ◯ | ◯ |
| Example 31 | 5B | ◯ | 2.9 | ◯ | ◯ | ◯ |
| Example 32 | 5B | ◯ | 3.1 | ◯ | ◯ | ◯ |
| Example 33 | 5B | ◯ | 3.5 | ◯ | ◯ | ◯ |
| Example 34 | 5B | ◯ | 3.8 | ◯ | ◯ | ◯ |
| Example 35 | 5B | ◯ | 1.8 | ◯ | ◯ | ◯ |
| Example 36 | 5B | ◯ | 1.5 | ◯ | ◯ | ◯ |

TABLE 3

|  | Adhesion (B-2) | Cracks (B-2) | Thermal Stability (⊿T %) (B-2) | Solvent Resistance (B-2) | Resistance to ITO (B-2) | Etching Resistance (B-2) |
|---|---|---|---|---|---|---|
| Example 1 | 5B | ◯ | 1 | ◯ | ◯ | ◯ |
| Example 2 | 5B | ◯ | 2 | ◯ | ◯ | ◯ |
| Example 3 | 5B | ◯ | 0.5 | ◯ | ◯ | ◯ |
| Example 4 | 5B | ◯ | 0.5 | ◯ | ◯ | ◯ |
| Example 5 | 5B | ◯ | 1 | ◯ | ◯ | ◯ |
| Example 6 | 5B | ◯ | 1.8 | ◯ | ◯ | ◯ |
| Example 7 | 5B | ◯ | 2 | ◯ | ◯ | ◯ |
| Example 8 | 5B | ◯ | 1.8 | ◯ | ◯ | ◯ |
| Example 9 | 5B | ◯ | 1.3 | ◯ | ◯ | ◯ |
| Example 10 | 5B | ◯ | 1.2 | ◯ | ◯ | ◯ |
| Example 11 | 5B | ◯ | 1.9 | ◯ | ◯ | ◯ |
| Example 12 | 4B | ◯ | 1.2 | ◯ | ◯ | ◯ |
| Example 13 | 5B | ◯ | 1.8 | ◯ | ◯ | ◯ |
| Example 14 | 5B | ◯ | 1.5 | ◯ | ◯ | ◯ |
| Example 15 | 5B | ◯ | 1.5 | ◯ | ◯ | ◯ |
| Example 16 | 5B | ◯ | 1.3 | ◯ | ◯ | ◯ |
| Example 17 | 5B | ◯ | 1.5 | ◯ | ◯ | ◯ |
| Example 18 | 5B | ◯ | 1.3 | ◯ | ◯ | ◯ |
| Example 19 | 5B | ◯ | 1.5 | ◯ | ◯ | ◯ |
| Example 20 | 5B | ◯ | 1.4 | ◯ | ◯ | ◯ |
| Example 21 | 5B | ◯ | 1.5 | ◯ | ◯ | ◯ |
| Example 22 | 5B | ◯ | 1.3 | ◯ | ◯ | ◯ |
| Example 23 | 5B | ◯ | 3.4 | ◯ | ◯ | ◯ |
| Example 24 | 4B | ◯ | 3.5 | ◯ | ◯ | ◯ |
| Example 25 | 5B | ◯ | 3.2 | ◯ | ◯ | ◯ |
| Example 26 | 4B | ◯ | 3.3 | ◯ | ◯ | ◯ |
| Example 27 | 5B | ◯ | 2.3 | ◯ | ◯ | ◯ |
| Example 28 | 5B | ◯ | 2.5 | ◯ | ◯ | ◯ |
| Example 29 | 5B | ◯ | 2.3 | ◯ | ◯ | ◯ |
| Example 30 | 4B | ◯ | 2.5 | ◯ | ◯ | ◯ |
| Example 31 | 5B | ◯ | 2.2 | ◯ | ◯ | ◯ |
| Example 32 | 4B | ◯ | 2.1 | ◯ | ◯ | ◯ |
| Example 33 | 4B | ◯ | 2.5 | ◯ | ◯ | ◯ |
| Example 34 | 5B | ◯ | 2.5 | ◯ | ◯ | ◯ |
| Example 35 | 4B | ◯ | 2.7 | ◯ | ◯ | ◯ |
| Example 36 | 4B | ◯ | 2.5 | ◯ | ◯ | ◯ |

TABLE 4

|  | Adhesion (B-3) | Cracks (B-3) | Thermal Stability (⊿T %) (B-3) | Solvent Resistance (B-3) | Resistance to ITO (B-3) | Etching Resistance (B-3) |
|---|---|---|---|---|---|---|
| Example 1 | 4B | ◯ | 2.5 | ◯ | ◯ | ◯ |
| Example 2 | 5B | ◯ | 1.9 | ◯ | ◯ | ◯ |
| Example 3 | 5B | ◯ | 1.4 | ◯ | ◯ | ◯ |
| Example 4 | 5B | ◯ | 2.5 | ◯ | ◯ | ◯ |
| Example 5 | 5B | ◯ | 2.7 | ◯ | ◯ | ◯ |
| Example 6 | 5B | ◯ | 2.9 | ◯ | ◯ | ◯ |
| Example 7 | 5B | ◯ | 3.5 | ◯ | ◯ | ◯ |
| Example 8 | 4B | ◯ | 1.8 | ◯ | ◯ | ◯ |
| Example 9 | 5B | ◯ | 2.2 | ◯ | ◯ | ◯ |
| Example 10 | 5B | ◯ | 2.6 | ◯ | ◯ | ◯ |
| Example 11 | 5B | ◯ | 2.8 | ◯ | ◯ | ◯ |
| Example 12 | 5B | ◯ | 2.5 | ◯ | ◯ | ◯ |
| Example 13 | 5B | ◯ | 2.5 | ◯ | ◯ | ◯ |
| Example 14 | 5B | ◯ | 2.7 | ◯ | ◯ | ◯ |
| Example 15 | 5B | ◯ | 3.2 | ◯ | ◯ | ◯ |
| Example 16 | 4B | ◯ | 1.8 | ◯ | ◯ | ◯ |
| Example 17 | 5B | ◯ | 2.2 | ◯ | ◯ | ◯ |
| Example 18 | 5B | ◯ | 2.2 | ◯ | ◯ | ◯ |
| Example 19 | 4B | ◯ | 3.5 | ◯ | ◯ | ◯ |
| Example 20 | 4B | ◯ | 3.6 | ◯ | ◯ | ◯ |
| Example 21 | 5B | ◯ | 0.9 | ◯ | ◯ | ◯ |
| Example 22 | 5B | ◯ | 2.2 | ◯ | ◯ | ◯ |
| Example 23 | 5B | ◯ | 3.2 | ◯ | ◯ | ◯ |
| Example 24 | 5B | ◯ | 3.5 | ◯ | ◯ | ◯ |
| Example 25 | 5B | ◯ | 3.2 | ◯ | ◯ | ◯ |
| Example 26 | 5B | ◯ | 3.6 | ◯ | ◯ | ◯ |
| Example 27 | 5B | ◯ | 1.8 | ◯ | ◯ | ◯ |
| Example 28 | 5B | ◯ | 1.5 | ◯ | ◯ | ◯ |
| Example 29 | 5B | ◯ | 0.9 | ◯ | ◯ | ◯ |
| Example 30 | 5B | ◯ | 3.3 | ◯ | ◯ | ◯ |
| Example 31 | 5B | ◯ | 2.4 | ◯ | ◯ | ◯ |
| Example 32 | 5B | ◯ | 3.5 | ◯ | ◯ | ◯ |
| Example 33 | 5B | ◯ | 1.3 | ◯ | ◯ | ◯ |
| Example 34 | 5B | ◯ | 1.2 | ◯ | ◯ | ◯ |
| Example 35 | 5B | ◯ | 1.9 | ◯ | ◯ | ◯ |
| Example 36 | 5B | ◯ | 1.7 | ◯ | ◯ | ◯ |

TABLE 5

| | Adhesion (B-1) | Cracks (B-1) | Thermal Stability (ΔT %) (B-1) | Solvent Resistance (B-1) | Resistance to ITO (B-1) | Etching Resistance (B-1) |
|---|---|---|---|---|---|---|
| Comparative Example 1 | 3B | ○ | 5.5 | x | Δ | ○ |
| Comparative Example 2 | 3B | ○ | 5.2 | Δ | Δ | ○ |
| Comparative Example 3 | 3B | ○ | 5.4 | Δ | Δ | ○ |
| Comparative Example 4 | 2B | ○ | 3.4 | Δ | Δ | ○ |
| Comparative Example 5 | 3B | ○ | 5.2 | Δ | Δ | ○ |
| Comparative Example 6 | 2B | ○ | 6.2 | Δ | Δ | x |
| Comparative Example 7 | 1B | ○ | 6.4 | Δ | x | x |
| Comparative Example 8 | 3B | Δ | 5.5 | Δ | x | x |
| Comparative Example 9 | 2B | Δ | 4.5 | ○ | x | x |
| Comparative Example 10 | 2B | Δ | 6.0 | x | Δ | Δ |
| Comparative Example 11 | 2B | x | 3.2 | x | x | Δ |
| Comparative Example 12 | 1B | x | 3.5 | x | Δ | x |
| Comparative Example 13 | 2B | x | 3.7 | x | Δ | ○ |
| Comparative Example 14 | 1B | x | 3.9 | x | x | Δ |
| Comparative Example 15 | 2B | x | 4.2 | x | Δ | ○ |
| Comparative Example 16 | 4B | x | 5.5 | x | Δ | ○ |
| Comparative Example 17 | 1B | x | 6.2 | Δ | x | ○ |
| Comparative Example 18 | 2B | x | 3.3 | x | x | Δ |

TABLE 6

| | Adhesion (B-2) | Cracks (B-2) | Thermal Stability (ΔT %) (B-2) | Solvent Resistance (B-2) | Resistance to ITO (B-2) | Etching Resistance (B-2) |
|---|---|---|---|---|---|---|
| Comparative Example 1 | 2B | Δ | 5.5 | x | Δ | ○ |
| Comparative Example 2 | 2B | Δ | 4.2 | x | x | Δ |
| Comparative Example 3 | 3B | Δ | 5.6 | x | x | Δ |
| Comparative Example 4 | 1B | x | 6.8 | Δ | x | ○ |
| Comparative Example 5 | 2B | x | 6.2 | ○ | x | x |
| Comparative Example 6 | 3B | x | 6.8 | x | Δ | ○ |
| Comparative Example 7 | 1B | x | 6.9 | Δ | Δ | ○ |
| Comparative Example 8 | 1B | x | 7.2 | ○ | x | x |
| Comparative Example 9 | 2B | x | 4.2 | ○ | x | x |
| Comparative Example 10 | 3B | x | 6.6 | Δ | Δ | ○ |
| Comparative Example 11 | 2B | x | 6.2 | x | Δ | ○ |
| Comparative Example 12 | 2B | x | 6.5 | x | Δ | ○ |
| Comparative Example 13 | 2B | x | 6.3 | ○ | x | x |
| Comparative Example 14 | 4B | x | 6.9 | Δ | Δ | ○ |
| Comparative Example 15 | 3B | x | 6.8 | Δ | Δ | ○ |
| Comparative Example 16 | 2B | x | 6.5 | x | Δ | ○ |
| Comparative Example 17 | 1B | x | 6.2 | x | Δ | ○ |
| Comparative Example 18 | 3B | x | 6.3 | Δ | x | ○ |

TABLE 7

| | Adhesion (B-3) | Cracks (B-3) | Thermal Stability (ΔT %) (B-3) | Solvent Resistance (B-3) | Resistance to ITO (B-3) | Etching Resistance (B-3) |
|---|---|---|---|---|---|---|
| Comparative Example 1 | 3B | ○ | 5.2 | x | Δ | ○ |
| Comparative Example 2 | 2B | x | 5.4 | Δ | Δ | ○ |
| Comparative Example 3 | 1B | x | 6.3 | ○ | x | x |
| Comparative Example 4 | 2B | Δ | 6.8 | x | x | Δ |
| Comparative Example 5 | 3B | x | 5.6 | Δ | Δ | ○ |
| Comparative Example 6 | 2B | x | 5.4 | x | x | Δ |
| Comparative Example 7 | 2B | ○ | 5.3 | x | Δ | ○ |
| Comparative Example 8 | 1B | x | 6.9 | ○ | x | x |
| Comparative Example 9 | 3B | ○ | 7.2 | Δ | Δ | ○ |
| Comparative Example 10 | 1B | x | 3.6 | Δ | Δ | ○ |
| Comparative Example 11 | 2B | ○ | 5.5 | x | Δ | ○ |
| Comparative Example 12 | 2B | x | 5.2 | x | Δ | ○ |
| Comparative Example 13 | 1B | ○ | 5.4 | ○ | x | x |
| Comparative Example 14 | 2B | ○ | 5.6 | x | x | Δ |
| Comparative Example 15 | 3B | ○ | 5.7 | x | Δ | ○ |
| Comparative Example 16 | 2B | ○ | 3.6 | x | Δ | ○ |
| Comparative Example 17 | 2B | ○ | 5.5 | ○ | x | x |
| Comparative Example 18 | 2B | ○ | 2.2 | Δ | Δ | ○ |

Referring to Tables 2 to 7, the film touch sensors of Examples showed enhanced thermal stability and solvent resistance, and thin-layered touch films capable of performing a transfer process were obtained using organic thin layers substantially without cracks and ITO wrinkles. However, the film touch sensors of Comparative Examples showed degraded results in at least one of the evaluation items.

What is claimed is:
1. A film touch sensor, comprising:
   a separation layer having an alkoxy group having 1 to 5 carbon atoms;
   a first protection layer having at least one substituent group of a hydroxyl group, a carboxyl group or an amide group on the separation layer; and an electrode pattern layer on the first protection layer, wherein, between the separation layer and the first protection layer, there is a chemical bond formed by reacting the alkoxy group having 1 to 5 carbon atoms from the separation layer, and at least one substituent group of a hydroxyl group, a carboxyl group or an amide group from the first protection layer.

2. The film touch sensor of claim 1, wherein the separation layer comprises a composition including a binder resin and a melamine-based curing agent containing the alkoxy group having 1 to 5 carbon atoms.

3. The film touch sensor of claim 2, wherein the melamine-based curing agent includes at least one selected from compounds represented by Chemical Formulae 1 to 6 below:

[Chemical Formula 1]

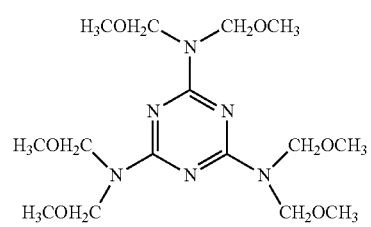

[Chemical Formula 2]

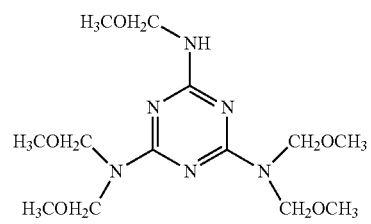

[Chemical Formula 3]

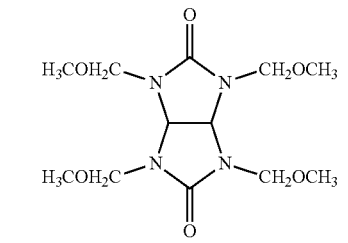

[Chemical Formula 4]

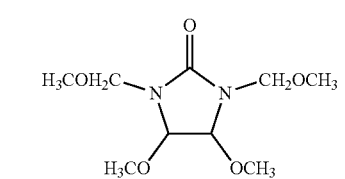

[Chemical Formula 5]

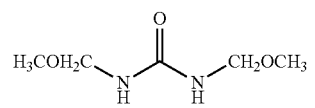

-continued

[Chemical Formula 6]

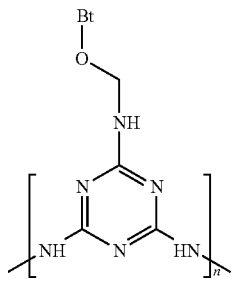

wherein, in the Chemical Formulae above, n is an integer from 5 to 20.

4. The film touch sensor of claim 2, wherein the binder resin of the separation layer includes at least one polymer including a repeating unit represented by Chemical Formula 7 or Chemical Formula 8:

[Chemical Formula 7]

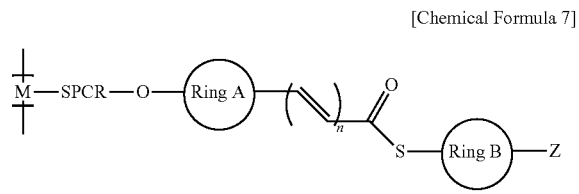

[Chemical Formula 8]

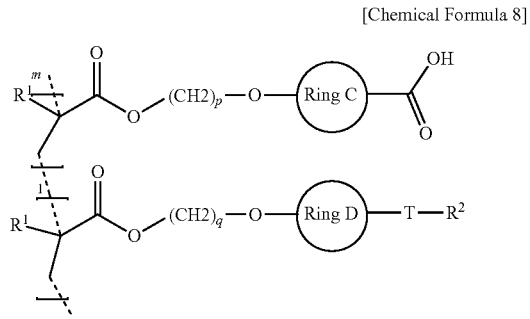

wherein, in Chemical Formulae 7 and 8, M is a monomer unit forming a backbone of a homopolymer or a copolymer;

SPCR is a spacer unit;

Ring A is a substituted or non-substituted alicyclic hydrocarbon, or a substituted or non-substituted aromatic ring;

Ring B is a substituted or non-substituted aromatic ring;

Z is an alkyl group, an alkoxy group, a cyano group, a nitro group, a halogen atom, —CH=CHZ$_1$, —C≡CZ$_1$ (Z$_1$ is an alkyl group, an alkoxy group, an alkoxy carbonyl group, an alkoxy sulfonyl group, a cyano group, a nitro group or a halogen atom), —COOZ$_2$ or —SO$_3$Z$_2$ (Z$_2$ is an alkyl group), n is 0 or 1;

R$^1$ is a hydrogen atom or a methyl group;

R$^2$ is a phenyl group substituted with a group selected from an alkyl group, an alkoxy group, a cyano group or a halogen atom;

Ring C and Ring D is each independently

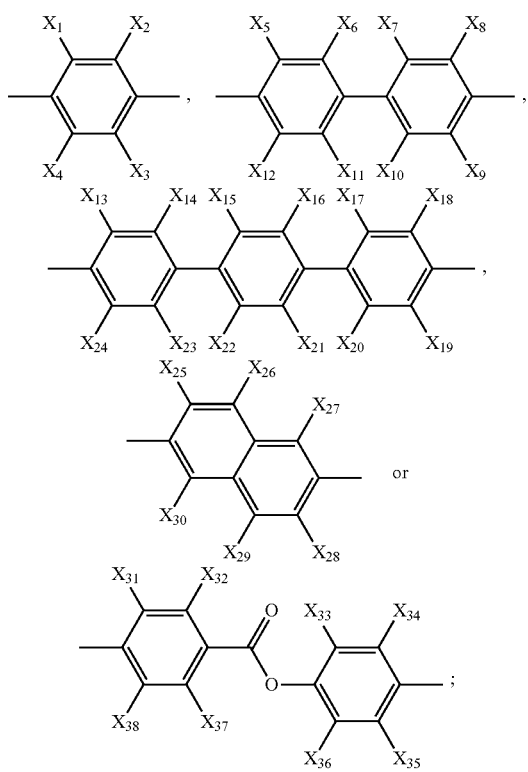

$X_1$ to $X_{38}$ each independently represents a hydrogen atom, an alkyl group, an alkoxy group, a halogen atom or a cyano group;

T is —CH=CHCOO— (a trans form) or —N=N—, p and q are each independently 1 to 12;

m and l each represents a mole ratio of each monomer which satisfies a relation of $0.65 \leq m \leq 0.95$, $0.05 \leq l \leq 0.35$ and m+l=1; and the alkyl groups are each independently a C1 to C12 alkyl group, and the alkoxy groups are each independently a C1 to C12 alkoxy group.

5. The film touch sensor of claim 4, wherein the melamine-based curing agent is included in an amount of from 120% to 250% relative to an equivalent amount of the polymer represented by Chemical Formula 7 or Chemical Formula 8.

6. The film touch sensor of claim 1, wherein the first protection layer comprises a composition comprising a polymer having at least one of a hydroxyl group, a carboxyl group or an amide group.

7. The film touch sensor of claim 6, wherein the polymer of the first protection layer includes at least one selected from the group consisting of repeating units represented by Chemical Formula 9 or 10:

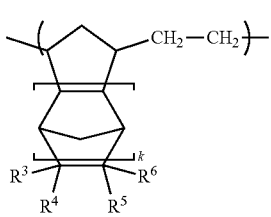

[Chemical Formula 9]

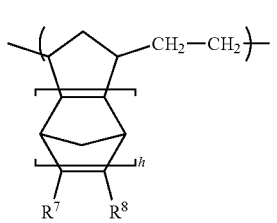

[Chemical Formula 10]

wherein in Chemical Formulae 9 and 10, at least one of $R^3$ to $R^6$ is -Hn-$Y_1$, n is 0 or 1, H is a C1 to C6 alkylene group or a carbonyl group, $Y_1$ is a protic polar group;

a remaining one of $R^3$ to $R^6$ except for the at least one is hydrogen or -Hn-$Y_2$, $Y_2$ is a C1 to C6 alkyl group, a C6 to C12 aryl group or a protic polar group, $Y_2$ is capable of being substituted with a C1 to C4 alkyl group or a C6 to C12 aryl group;

$R^7$ and $R^8$ are connected to each other to form a three-membered or five-membered hetero ring capable of being substituted with a C1 to C4 alkyl group or a C6 to C12 aryl group;

k is an integer from 0 to 2;

h is an integer from 0 to 2; and the protic polar groups are each independently a hydroxyl group, a carboxyl group or an amide group.

8. The film touch sensor of claim 6, wherein the polymer of the first protection layer has a weight average molecular weight ranging from 1,000 to 1,000,000.

9. A touch screen panel including the film touch sensor of claim 1.

10. An image display device including the touch screen panel of claim 9.

* * * * *